Oct. 23, 1951     A. S. TORRES     2,572,679
ROASTING METHOD
Filed May 16, 1950     5 Sheets-Sheet 2

FIG. 2

INVENTOR.
AUGUST S. TORRES
BY Robert S. Dunham
ATTORNEY

Oct. 23, 1951        A. S. TORRES        2,572,679

ROASTING METHOD

Filed May 16, 1950                                     5 Sheets-Sheet 5

INVENTOR.
AUGUST S. TORRES
BY Robert S. Dunlap
ATTORNEY.

Patented Oct. 23, 1951

2,572,679

UNITED STATES PATENT OFFICE 2,572,679

ROASTING METHOD

August S. Torres, Framingham, Mass.

Application May 16, 1950, Serial No. 162,335

6 Claims. (Cl. 99—68)

This invention relates to a method of roasting edible beans, nuts and grains, and to a machine and automatic control means therefor whereby such method may be practiced. The invention will be described with reference to the roasting of coffee, but it is to be understood that it is equally applicable to the roasting of other beans, nuts, or grains having characteristics in common with coffee.

In the conventional method of roasting coffee the green coffee beans are agitated in a rotary drum for a period of time ranging from fifteen to thirty minutes while maintaining the roasting atmosphere, in which the batch under treatment is being agitated, at a temperature of about 420° F. It has heretofore been sought to reduce the period of time in which coffee may be roasted to render it feasible to roast batches of coffee in a much shorter period of time. The application of increased heat alone has been ineffective for the reason that coffee will burn at temperatures in excess of 420° F. or thereabouts. However, in my patent No. 2,464,421 I have disclosed a roasting method wherein temperatures substantially higher than 420° F. are applied to the batch of coffee being roasted and wherein the application of the increased temperature is made possible without danger of burning the beans or effecting a superficial roast by utilizing radiant heat in the infrared band of the spectrum in combination with convection heating currents of such temperatures that would ordinarily result merely in the burning of the green beans or in their superficial roasting.

The method described in my aforesaid patent makes it imperative that the control thereof be expeditiously exercised. When a roasting method is conducted at a relatively high temperature to effect a satisfactory roast in a short period of time, the time consumed by control functions such as the complete discharge of a roasted batch of coffee from a roasting chamber is of vital importance for the reason that in such method the undesired continuation of the roasting process for as little as ten or fifteen seconds may result in over-roasting.

It is, therefore, the principal object of this invention to provide a method for controlling the roasting temperatures and the roasting time that will lend itself to operation within relatively narrow time and temperature limitations. Thus, one of the main objectives of the invention is the provision of a roasting method that provides adequate time for the discharge of a roasted batch of coffee from a roasting drum without at the same time suffering any substantial increase in temperature within the roasted batch of beans. To the end that the contemplated method may be effective, it provides for the discontinuance of applied heat to the roasting oven at a preselected temperature and the subsequent, simultaneous discharge of the roasted beans from the roasting chamber after the temperature of the beans has reached a preselected higher temperature.

It is a further object of the invention to provide a roaster control that is cyclic in nature and responsive to the temperatures herein disclosed as the optimum temperatures for producing the most acceptable roasts.

Since it is the prime object of this invention to provide a roasting method that is effective to roast quantities of green beans in a short period of time, it is of importance that the amount of heat applied to the batch of beans being processed be controlled with accuracy, and to this end the various functions of the roasting cycle must be performed with dispatch so that the time during which the roasting heat is applied is accurately controlled.

The concept that a roasting cycle can be adequately controlled by temperature responsive devices has not been generally accepted heretofore in the industry because of knowledge of the fact that different batches of coffee will roast differently under a given roasting temperature. My method is predicated on my discovery that diverse batches of green beans will roast to the same degree if provision is made for applying the roasting heat to the batch over a variable period of time until the moisture content of the batch has been substantially reduced, then discontinuing the application of externally applied heat while allowing the temperature of the beans to rise by a kind of exothermic action, and thereafter removing the batch with great promptness when a predetermined higher temperature has been attained.

It has been my observation that the first and longest portion of the roasting period effects a dehydration of the beans with very little attendant real roasting thereof, and that the final and relatively short phase of the roasting period brings about a relatively rapid roasting of the batch. The so-called preliminary or dehydrating phase of the cycle will vary in length depending on the condition of the green beans which is affected by bean age, variety, moisture content, etc. The final roasting phase, however, varies very little and usually proceeds so rapidly that adequate control thereof has been difficult.

It is also to be observed that when the roast is produced in a closed roasting oven as it must be for the rapid roasting of a batch, the rate of heat increase within the beans as the end of the roasting period approaches becomes so great that it is difficult to remove the batch from the roasting atmosphere at the proper time to control the roast to a desired degree.

To overcome the foregoing difficulty I discontinue the application of heat to the batch under treatment at a point which I have determined to be the point of substantial bean dehydration, and thereafter allow the bean temperature to rise at a relatively constant rate during the final phase of roasting by virtue of a kind of exothermic action by which the roast is completed at a slower rate than would prevail if there were continued application of heat. Thereby the rate of temperature rise is kept relatively low and substantially constant with the result that a longer stable period is provided for discharging the roasted batch from the roasting atmosphere.

In the specific practice of my method I have used the roasting machine disclosed herein. I have preheated the roasting oven by using four infrared lamps having a total capacity of 2000 watts. These lamps supply but a minor portion of the roasting temperature, but they appear to aid in the roasting operation by supplementing the convection heat currents within the roasting chamber which are generated by four resistance heaters having a total capacity of 4800 watts. In this respect the generation and application of heat to the batch being roasted is according to the teaching of my prior Patent No. 2,464,421.

The roasting chamber was preheated to somewhat more than 400° F. at which time the heating devices were disabled, and a five pound batch of green coffee was charged into the roasting cylinder. Entrance of the cold batch of beans into the roasting cylinder was accomplished by a sharp drop in the temperature therein, and when the temperature dropped to 350° F. or below the heating devices were reenergized. In a typical example there was a lapse of 25 to 30 seconds between the charging of the cylinder and the reactivation of the heating devices. Upon loading of the green beans into the cylinder, the cylinder was set into rotation and maintained in rotation throughout the roasting period.

Even after the heating elements were reenergized at 350° F. the temperature within the roasting drum continued to drop for another 75 or 80 seconds until a bean temperature of 260° F. was observed. Thereafter, the batch of beans under treatment became subject to the dehydrating effect of the hot atmosphere within the roasting drum and the temperature of the beans within the drum exhibited a gradual rise over a period of 160–170 seconds until a predetermined temperature of 360° F. was reached. At this point the heating devices were again disabled and the roast was permitted to proceed to completion under the influence of the heat stored within the batch of beans and the oven. In the period of time from the loading of the batch into the cylinder to the time the heating elements were again disabled at 360° F., substantial dehydration of the batch under treatment had taken place. Within the next 45–50 seconds the temperature of the beans was observed to rise to 395° F., since this latter temperature has been determined to result in a good roast, the attainment of this temperature was utilized to initiate the removal of the beans from the roasting atmosphere. Thereafter the roast was subjected to the action of a cooling atmosphere.

When the roasted batch was examined, it was found to be thoroughly roasted throughout, each bean was a dark shade of brown and examination of the individual beans revealed that they were thoroughly roasted throughout and that the essential oils and consequently the flavors had been fully developed. The green beans that were charged into the roasting drum measured 39 cubic inches per pound. The roasted beans on the other hand had expanded to a very favorable degree and measured 78 cubic inches per pound. The weight loss on the other hand was remarkably low, being of the order of only 10 to 12 percent. When the coffee was subjected to cup tests by expert testers, it was found to have a remarkably fully developed flavor and body.

The temperature and time limitations hereinabove set forth are of course merely exemplary. If a light roast is to be produced the predetermined control temperatures will be correspondingly lowered, and on the other hand if a roast is to be dark, as for example a French roast, the predetermined control temperatures will be somewhat increased. It has been my experience that very light roasts can be produced by an end temperature of 360° F. and that for very dark roasts as much as 410° F. may be applied. The point at which the heaters may be activated after the batch has been charged into the roaster may be somewhat varied, and this is also true of the point at which the heaters are disabled prior to the discharge of the roast from the heaters. These temperature points may be independently varied, but it has been my experience that a differential of 25° F. to 45° F. should be maintained between the point at which the heating devices are initially deenergized and the point at which the roasted batch is discharged from the roasting drum.

The relationship of the temperature at which the heating devices are disabled and the point at which the batch is discharged from the drum must be maintained in such a manner as to keep the rate of temperature rise between the two points within predetermined limits and thereby provide for more accurate discharge control. It will be observed that the entire roasting cycle from the time that the green batch is charged into the roasting cylinder until the roasted batch is discharged is from four to five minutes. The brief time required for roasting the batch naturally adapts the method to point of sale use, and if such method is adapted to automatic control and to cyclic operation as herein provided it fulfills the requirements of modern day merchandising methods.

Other objects and advantages of the invention both as to the method thereof and as to the machine and its controls will appear as the description in respect thereto is read in light of the drawings forming a part of this application and in which.

The roasting machine includes generally a green bean supply hopper A, a bean meter B, a roasting oven C and a cooling compartment D. The metering hopper B, the roasting oven C and the cooling compartment D are under the control of electrically actuated mechanism whereby the roaster is adapted to automatic cyclic operation.

The green bean supply hopper A discharges into the charging throat 10 of the metering device B. The green bean metering device has a generally cylindrical bean receiving chamber 12 which in the present instance is designed to meter five pounds of green beans. The green bean charging throat 10 extends in an axial direction through the wall of the receiving chamber 12, and the chamber 12 has a discharge throat 14 extending axially through the wall of the metering device at a point diametrically opposite the receiving throat 10 and in alignment with a passage into the roasting oven C and in position from which the green beans from the metering device may be discharged into a rotary roasting drum within the roasting oven. The charging of green beans into the metering device and discharge thereof from the metering device is under the control of a charging gate 16 and a discharging gate 18. The gates 16 and 18 are carried by a spider mounted for oscillating motion on a centrally disposed shaft 20. The gates 16 and 18 are offset in respect to each other so that the gate 16 is open to permit charging of green beans into the receiving chamber 12 of the meter while the gate 18 overlies the discharge throat 14 of the metering device. It will appear, therefore, that as the control gates 16 and 18 are oscillated about the shaft 20, the charging throat 10 and the discharge throat 14 of the metering device will be alternately opened and closed.

One end of the shaft 20 has affixed thereto an operating lever 22 to one end of which is pivoted a link 24, interconnecting the same with the core of a solenoid A9. The control gates 16 and 18 are normally held in the position shown in Fig. 1 of the drawings under the tension of a spring 26 which has one end thereof attached to the operating lever 22 and the other end thereof to a stationary frame member. Thus, the control gates 16 and 18 are normally conditioned to permit green beans to enter the metering chamber but to prevent their discharge from the chamber until the gates are oscillated to their opposite position under the influence of the solenoid A9.

The discharge throat 14, as hereinabove noted, leads into the roasting oven C. The roasting oven C is generally a cylindrically shaped body whereof the walls are of spaced sheets having therebetween heat insulating material 30. The oven is fixed to the roaster frame and is adapted to receive therein a plurality of resistance heaters H1–H4. These heaters are mounted in one end wall 32 of the oven with terminals thereof extending to the outside of the oven wall where electrical connections to a power line may be effected with the greatest convenience. Extending through the end wall 32 of the oven are a pair of thermostatic elements TH2 and TH3 by which the operating cycle of the roaster is in part controlled. The bulbs of the thermostatic elements TH2 and TH3 are disposed so that during the normal operation of the roaster these bulbs will be responsive to the bean temperature rather than to the ambient oven temperature. The heater elements H1–H4 are encased in a stationary shield 34 which is designed to prevent direct contact between beans being roasted and the heating elements themselves.

A roasting drum 36 is mounted within the oven for rotation through the roasting cycle. To this end a drum supporting shaft 38 extends from the end wall of the drum 36 and is mounted for rotation in a pair of bearings located in a gooseneck 40 which is mounted and extends laterally from a fixed control cam plate 42 adjacent one end of the roasting drum 36. The rear wall of the oven C is apertured to receive the face of a plurality of infrared ray lamps L1–L4. These lamps are positioned to project their rays against a charge of beans being roasted in the roasting drum 36. In a specific embodiment of the invention there has been provided four resistance heaters H1–H4 having a total capacity of 4800 watts. In this same specific embodiment there has been provided four infrared ray lamps L1–L4 having a capacity of 2000 watts.

Figure 4:
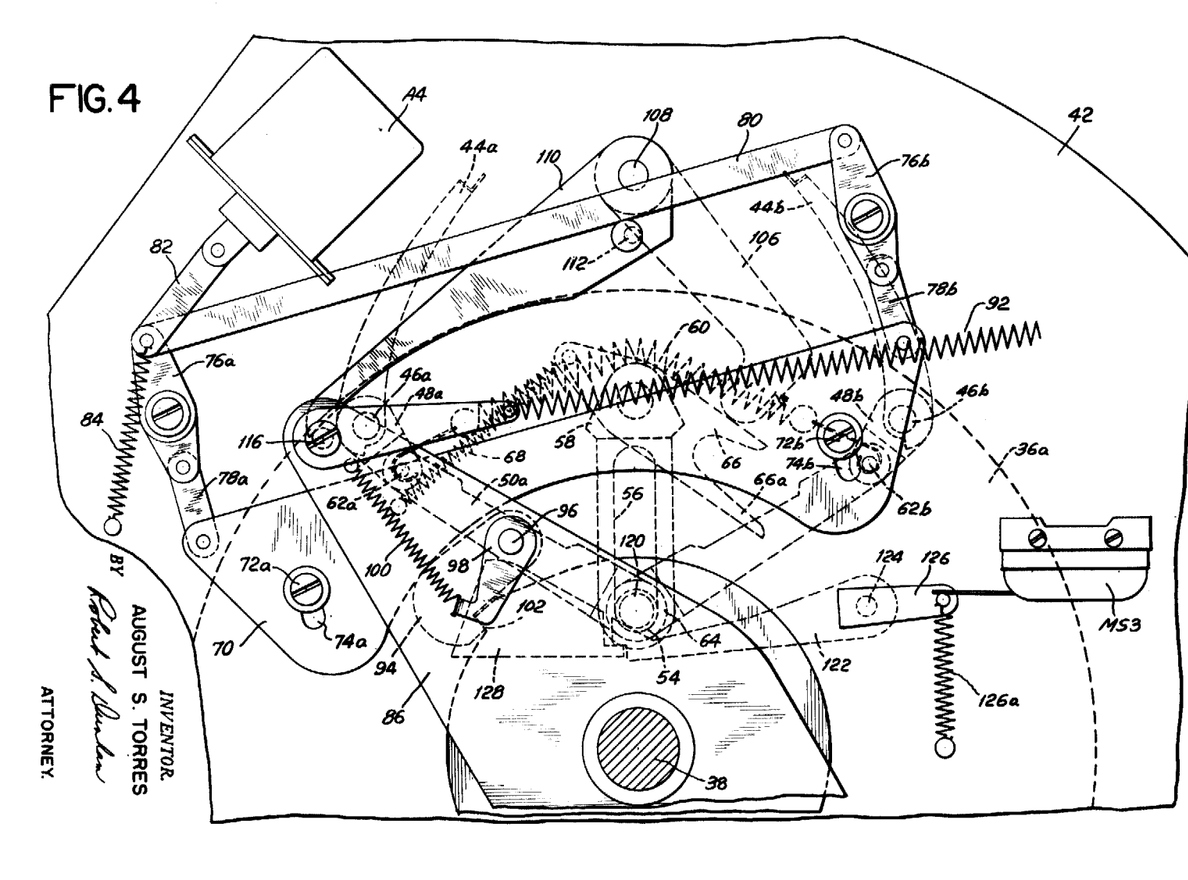
Fig. 4 is a view of the cylinder control mechanism showing the position of the parts after the cylinder doors have been opened.

The roasting drum 36 has a pair of doors which are adapted to open to receive green beans and to discharge the roasted beans. Reference to Fig. 4 of the drawings will show these doors as consisting of a pair of segmental sections 44a and 44b. These sections are mounted on roasting drum supported shafts 46a and 46b, which shafts are rotatably mounted in the end wall of the roasting drum and with which the doors 44a and 44b are adapted to swing when the shafts are rocked about their axes. The shafts 46a and 46b have toggle links 48a, 48b, respectively, attached to the ends thereof which extend outwardly beyond the end wall 36a of the roasting drum. These toggle links in turn have links 50a and 50b pivoted thereto, the links 50a and 50b being joined by means of a pin 52. The pin 52 on its inner end has fixed thereto a roller 54 which is adapted to move in a guideway 56 carried on the end wall 36a of the roasting drum.

The guideway 56 includes a head 58 over which is trained a spring 60 having its opposite ends attached to the extending end 62a and 62b of the respective pivot studs joining the toggle links 48a and 50a on the one hand and 48b and 50b on the other hand. It will be observed, therefore, that the toggle linkage, under the influence of which the doors 44a and 44b operate, is in the nature of an over-center device which will result in the rapid opening and closing of the doors.

The machine contemplates electrically controlled means for causing the roasting drum doors to open in green bean receiving position and to close in roasted bean discharging position. Inasmuch as the mechanism for accomplishing these respective functions is precisely the same in structure and operation, there has been illustrated in Figs. 3 and 4 only that mechanism for opening and closing the roasting drum doors at the green bean receiving position. A comprehension of the nature and operation of that mechanism will render it equally clear how similar mechanism is operative to open and close the roaster doors in the roasted bean discharge position.

The fixed cam plate 42 has mounted on the face thereof a lever and linkage organization which is adapted to engage a roller 64 positioned on the connecting stud 52 upon which the levers 50a and 50b operate for opening the roasting cylinder doors. To the rear face of the cam plate 42 is pivoted a forked member 66 which is disposed in the same plane as that in which the roller 64 rotates in the normal operation of the roasting drum. An elongated leg 66a of the forked member 66 is held above the path of the roller 64 by means of a spring 68. When the doors 44a and 44b are closed, the door operating linkage is so disposed that the guide roller 54 on the pin 52 is at the upper end of the guideway 56. It will be observed, therefore, that in order to open the cylinder doors it will be necessary to displace the roller 54 and its associated linkage to a position at the bottom of the guideway 56, such as shown in Fig. 4 of the drawings. This displacement is accomplished by means of the forked operating finger 66 which is adapted to engage the roller 64 while the roasting cylinder 36 is still rotating, the forked finger 66 being fixed to the stationary plate 42. This chain of events is brought about when the solenoid A4 is energized.

Figure 3:
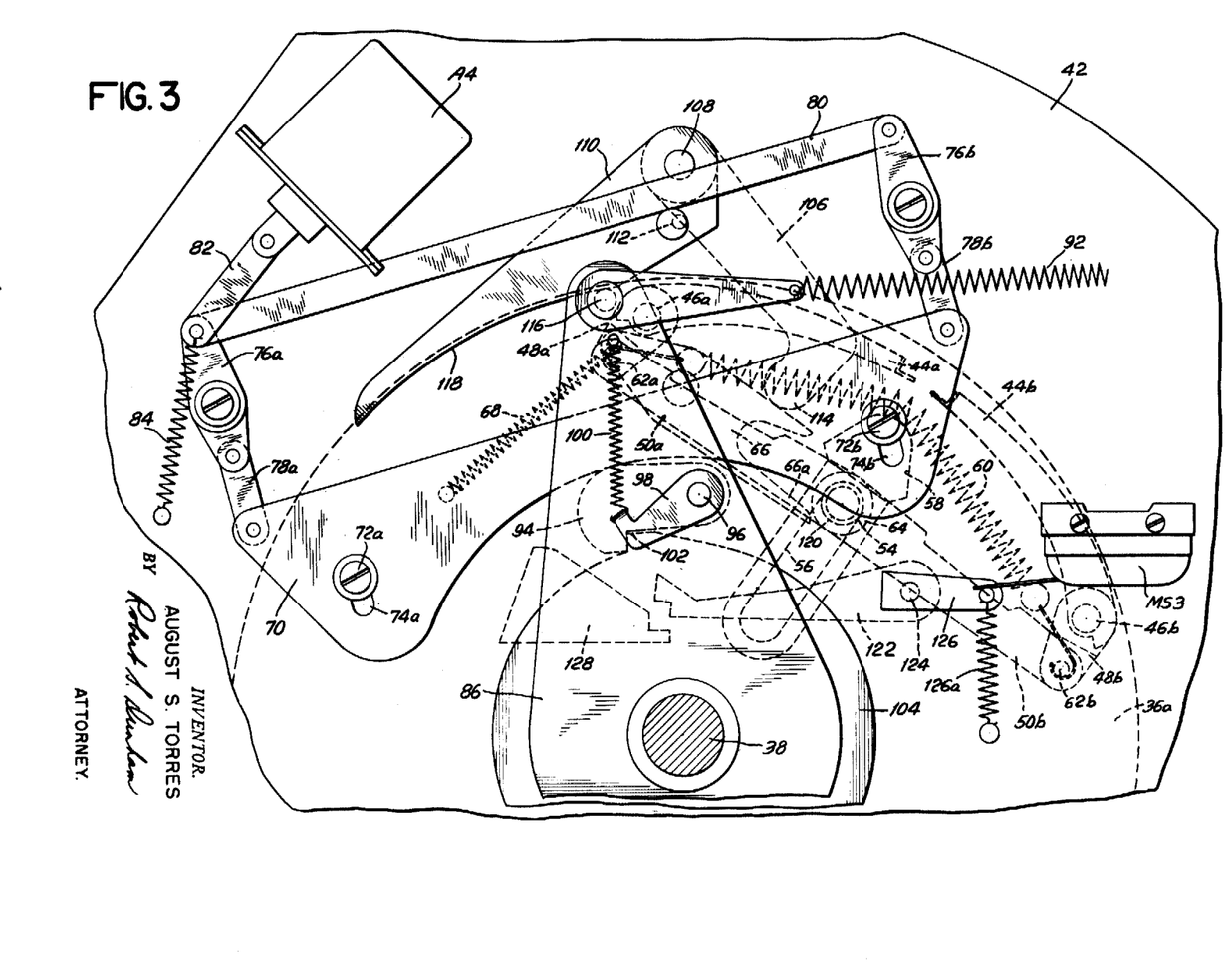
Fig. 3 is a view of the roasting cylinder control mechanism showing the condition of the elements at the beginning of the control cycle.

The solenoid A4 and associated linkage is mounted on the face of the cam plate 42. The inoperative position of the solenoid linkage is shown at the bottom of the plate 42 in Fig. 1 of the drawings. The position of the linkage as it begins to operate is shown at the top of the cam plate in Fig. 1 of the drawings. The operating linkage in its fully operative position is shown in Fig. 3 of the drawings at an instance prior to engagement between the forked finger 66 and the roller 64, while in Fig. 4 the position of the parts are those after the control has been exercised and the doors of the cylinder have been opened.

Figure 1:
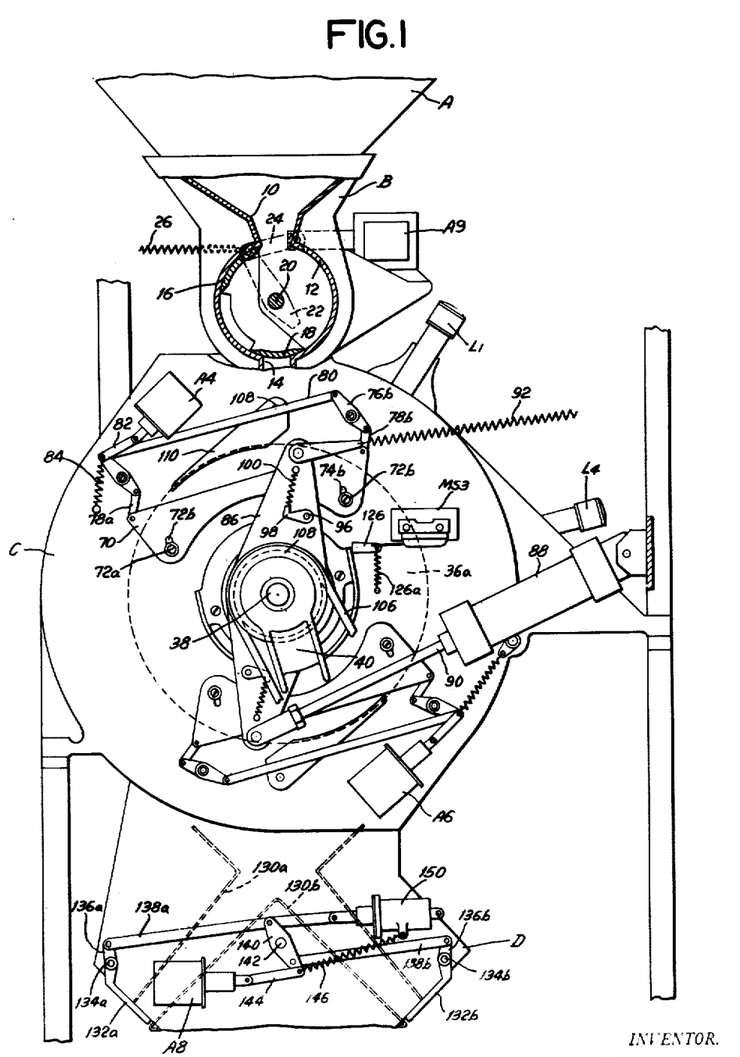
Fig. 1 is a side elevational view of the roasting machine, parts being broken away to show underlying structures.
Figure 2:
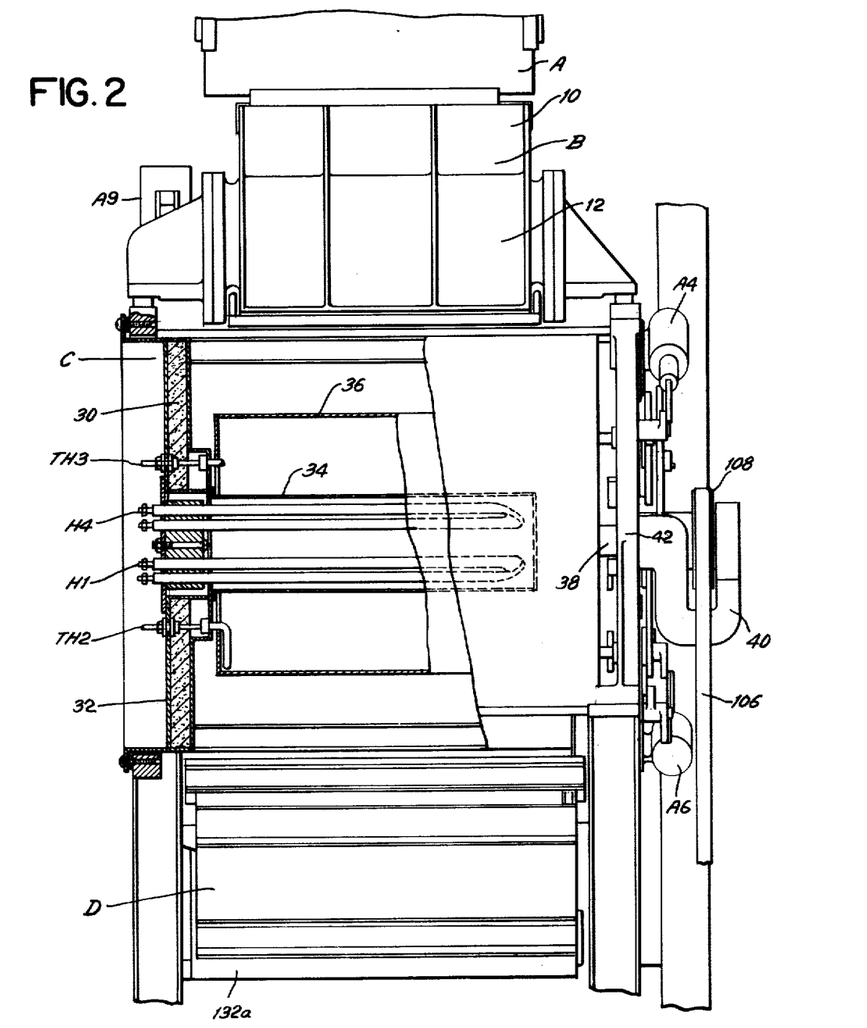
Fig. 2 is a front elevational view of the roasting machine, parts being broken away to show underlying structures.

A control shoe 70 is mounted on the plate 42 by means of a pair of spaced studs 72a and 72b which extend through elongated slots 74a and 74b of the control shoe 70. These studs, therefore, mount the shoe for limited movement toward and away from the axis of the roasting drum. The shoe 70 is controlled by toggle linkage under the influence of the solenoid A4. The toggle linkage consists of pivoted levers 76a and 76b to one end of each of which the control shoe 70 is pivotally connected by means of links 78a and 78b, respectively. The opposite ends of the pivoted levers 76a and 76b are connected to each other by means of a connecting link 80. One of the pivoted levers, herein the pivoted lever 76a, is connected to the core of the solenoid A4 by means of a link 82. The toggle linkage is urged to an inoperative position by means of a spring 84. When the solenoid A4 is energized, the control shoe 70 is moved inwardly and thereby there is effected a mechanical connection between the shaft 38 and a stop lever 86. The stop lever 86 is freely mounted on the cylinder shaft 38 for limited rocking motion thereon under the restraint of a dashpot 88 whose piston is connected to one end of the stop lever by means of a connecting rod 90. A spring 92 having one end thereof attached to the stop lever 86 and the other end thereof attached to a fixed frame member tends to retain the stop lever 86 in its normal inoperative position as shown in Fig. 1 of the drawings.

The stop lever 86 has pivoted to the inner face thereof a pawl 94. The pin 96 on which the pawl 94 is mounted extends to the forward face of the stop lever 86, and has attached thereto a lever 98 which is biased under the influence of a spring 100 to rotate it and its attached pawl 94 in a clockwise direction. The pawl 94 is in the same vertical plane as the control shoe 70 and the upper surface thereof is normally held against the adjacent edge of the control shoe 70 under the influence of the spring 100. However, should the pawl 94 be depressed, it is so positioned as to engage a shoulder 102 in the periphery of a clutch disc 104 which is fixed to the cylinder shaft 38. In effect, therefore, the pawl 94 will clutch the stop bar 86 and the clutch plate 104 in driving relation with each other.

The cylinder 36 is driven through its shaft 38 by means of a motor (not shown) operating through a friction clutch (not shown) and a drive belt 106 which engages a drive pulley 108 that is keyed to the end of the shaft 38. Because of the friction clutch, rotation of the cylinder 36 and its shaft 38 may be arrested during the cylinder charging and discharging intervals without disabling the drive motor.

It can now be appreciated that the initial inward movement of the control plate 70 rotates the pawl 94 in a counter-clockwise direction and into the path of the shoulder 102 on the clutch disc 104. It may be assumed that Fig. 3 shows the position of the parts about ten degrees after the pawl 94 and the shoulder 102 have been engaged. Such engagement will continue and continued rotation of the cylinder shaft 38 will cause the stop lever 86 to swing about the cylinder shaft in a counter-clockwise direction until the position of the parts as shown in Fig. 4 has been attained and the green coffee has been loaded into the roasting cylinder. At this time the piston in the dashpot cylinder 88 is at the bottom of its stroke and rotation of the shaft is arrested.

It remains to be seen how the roasting cylinder doors 44a and 44b are operated, and for this purpose there may be seen an operating lever 106 on the inner face of the cam plate 42. The lever 106 is mounted on the inner end of a shaft 108 which extends through the cam plate 42 and which has affixed to its extending end an operating lever 110. Movement of the levers 106 and 110 is limited by a limiting stud 112. The free end 114 of the lever 106 is disposed adjacent the forked lever 66. Thus, when the lever 106 is rocked in a clockwise direction it engages the forked lever 66 and moves the latter in a clockwise direction to position the forked end of the lever in the path of the roller 64, as best shown in Fig. 3 of the drawings, wherein the lever 106 has been actuated to position the forked lever 66 as required to effect engagement therebetween and the roller 64. The operated position of the lever 106 has been achieved through the clockwise operation of the lever 110 under the influence of a stud 116 which extends inwardly from the upper free end of the stop bar 86, the position of the stud 116 being such as to engage the surface 118 of the operating lever 110 and elevate the same sufficiently to depress the operating finger 106 the required amount.

When the roller 64 engages the forked lever 66, the lever is rotated in a clockwise direction and the point of connection between the toggle levers 50a and 50b is thereby depressed sufficiently to cause the linkage to snap over-center under the influence of the spring 60, and thereby open the cylinder doors 44a and 44b. Inasmuch as the longer finger 66a of the forked lever is insufficiently long to engage behind the roller 64 when it is in its inner position as shown in Fig. 4, the lever 66 will return to its normal position under the influence of its spring 68. As the joint of the toggle linkage 50a and 50b arrives at its inner limit position, a cam roller 120 on the pin 52 will engage a switch operating arm 122 of which an operating stud 124 extends to the face of the cam plate 42 and through which an operating extension 126 is adapted to close a switch MS3 which controls the charging of green beans into the roasting hopper by energizing the solenoid A9 which operates the metering mechanism as hereinbefore described.

Upon deenergization of the solenoid A4 the spring 84 will return the solenoid toggle linkage and consequently the operating shoe 70 to its outer normal position, thereby permitting the pawl 94 to disengage the shoulder 102 of the clutch plate 104. Thereupon the slip-clutch in the drive train will be effective to further rotate the cylinder 36 in normal course through a roasting cycle.

However, provision must be made for returning the toggle linkage 50a and 50b to its normal cylinder door closing position, and to this end there has been provided on the inner face of the cam plate 42 a cam track 128 whereby the normal counter-clockwise rotation of the cylinder the roller 120 will be forced outwardly along its guideway 56 to the point where the control spring 60 causes the linkage to operate with a snap and causes the doors 44a and 44b to close with a rapid motion.

The foregoing has been a description of the opening and closing of the roasting cylinder doors in green bean receiving position. It has been stated hereinbefore that a duplicate set of instrumentalities are employed for the arresting rotation of the roasting cylinder in roasted bean discharging position. When such discharge takes place the beans fall promptly and substantially simultaneously from the roasting drum into the cooling compartments 130a and 130b of the cooler D. The walls of the cooling compartments 130a and 130b are of foraminous material and the compartments themselves are relatively shallow so that the beans discharged from the roasting drum will be disposed in a pair of separate, relatively thin layers. Since the walls of the cooling compartments are of foraminous material a cooling current may be circulated to accelerate the cooling action. In any event the cooling compartments 130a and 130b open downwardly for discharge purposes and the discharge throats thereof are normally closed by a pair of doors 132a and 132b. These doors are connected to each other for simultaneous operation under the influence of a solenoid A8, the solenoid A8 and door operating linkage being mounted on one side of the cooler D. The discharge doors 132a and 132b are pivoted for swinging motion about transverse rods 134a and 134b, respectively, whereby the doors may be swung to open and closed position as may be desired.

The doors are interconnected for simultaneous operation through a linkage system including extensions 136a and 136b of the door mounting bracket to which are pivotally connected a pair of operating levers 138a and 138b, respectively. The opposite ends of the levers 138a and 138b are connected respectively to the opposite ends of a pivoted actuator 140 so that operation of the actuator 140 will serve to open the doors in one direction of movement and close the same in the other direction of movement. As constituted in the present roaster, the solenoid A8 when energized will rock the actuator 140 about its pivot point 142 in a clockwise direction because of the pivoted connection 144 between the core of the solenoid and one end of the actuator 140. The doors are opened against the tension of a spring 146 and in cooperation with a dashpot 150 so that when the solenoid A8 is deenergized, the doors will close without further attention.

Figure 5:
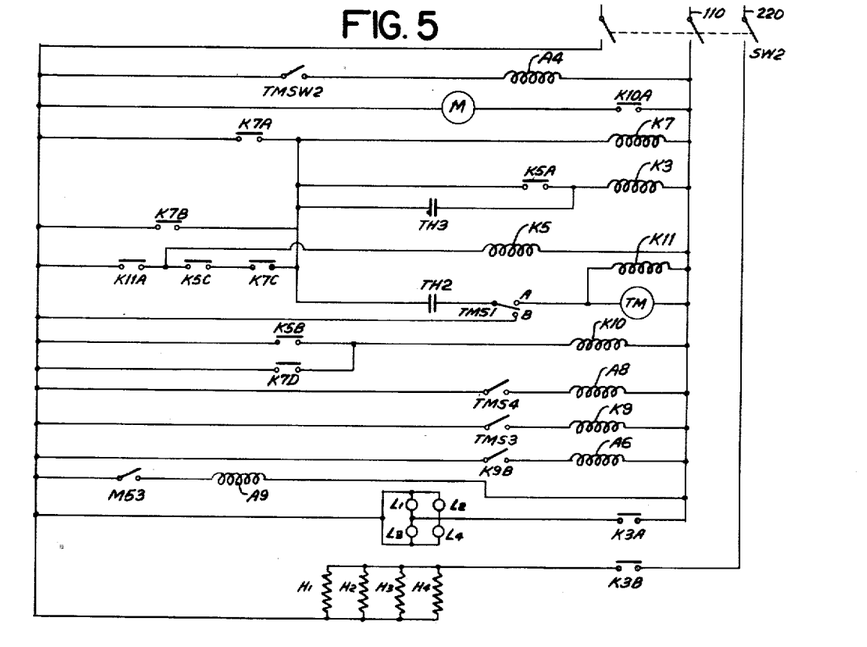
Fig. 5 is a diagram showing the electrical control system.

A sequence of roasting operations may be carried out in the roaster without the intervention of an attendant once the roaster has been energized. The manner in which the roasting cycle or a sequence of roasting cycles is controlled is best shown by reference to the control diagram in Fig. 5 of the drawings. When the main switch SW2 is closed, power is applied to the control circuits. Closure of the main switch SW2 completes a circuit through a relay coil K7 and through normally closed relay points K7A (relay points K7A being closed when the relay coil K7 is deenergized). When the relay coil K7 is energized, the relay points K7A are opened and relay points K7B, K7C and K7D are closed. Closure of the relay points K7B completes a circuit through the relay coil K7 and through the now closed relay points K7B. Closure of the relay points K7B thus maintains the relay coil K7 in an energized condition.

Closure of the relay points K7B or K7A completes a circuit through a heater circuit relay coil K3, through the closed temperature control thermostat TH3 and through normally closed relay points K5A. The thermostat TH3 is normally closed when the temperature adjacent the bulb thereof is below 350° F., and it is adapted to open when the temperature rises to 360° F. The relay points K5A are closed when the relay coil K5 is in a deenergized condition. The heater circuit relay coil K3 is energized when either of the above described circuits are completed upon closure of the main switch SW2 which results in a closure of relay points K3A, which closure completes the power circuit for the bank of infrared lamps L1 through L4. When the heater circuit relay coil K3 is closed, relay points K3B close and complete the power circuit to the bank of resistance heaters H1 through H4.

Closure of the relay points K3A and K3B as described results in the flow of current to the heating elements for the roasting oven and, as a consequence thereof, the temperature in the roasting oven will begin to rise. At the same time closure of the relay points K7D under the influence of the relay coil K7 completes a circuit through a motor circuit relay coil K10. When the motor circuit relay coil is operated, points K10A thereof close and complete a power circuit through the main driving motor M. When the motor M is energized, the roasting drum is rotated through the belt drive 106 and an intervening friction clutch power take-off (not shown).

With power flowing through the lamps L1 through L4 and the resistance heaters H1 through H4, the temperature within the roasting oven will rise. When a temperature of 360° F. therein is attained, the temperature control thermostat TH3 will open. However, during the preheating stage opening of the thermostat TH3 does not deenergize the heater circuit relay coil K3 which controls the relay points K3A and K3B in the lamp and heater circuits, respectively. Current flow through the heater circuit relay coil K3 on the other hand is maintained by a parallel circuit through the normally closed relay points K5A (with relay K5 deenergized), and the temperature in the roasting oven will thus continue to rise until a preheating temperature of somewhat more than 400° F. is reached. At this point in the preheating cycle a roast control thermostat TH2 will close.

Closure of the roast control thermostat TH2 completes a circuit through a timing motor TM, the "A" point of a timing motor switch TMS1, the now closed roast control thermostat TH2 and the closed relay points K7B. When the roast control thermostat TH2 is closed, a circuit is also completed through a relay coil K11A which is connected in parallel with the timing motor TM. Closure of the roast control thermostat TH2 in response to an oven temperature of 395° F. thus results in the starting of the timing motor TM.

Closure of the roast control thermostat TH2 also results in the opening of the power circuit to the lamps L1 through L4 and to the heaters H1 through H4. When the relay coil K11 is energized as described above, relay points K11A are closed. Closure of the relay points K11A completes a circuit through the relay coil K5. When the relay coil K5 is energized, normally closed relay points K5A are opened and this results in the opening of the circuit through the heater circuit relay coil K3 (temperature control thermostat TH3 being open for all temperatures above 360° F.) deenergizing the relay coil K3 and opening the previously closed relay points K3A and K3B. When the relay coil K5 is energized, relay points K5C close and maintain the relay coil K5 energized (relay points K7C being closed). Opening of the relay points K3A and K3B opens the power circuit to the lamps and heaters, respectively.

Five seconds after the timing motor TM starts (through closure of the roast control thermostat TH2), the movable arm of the timing motor switch TMS1 moves from the "A" point to the "B" point. Closure of the "B" point of the timing motor switch TMS1 connects the timing motor TM across the voltage source. Opening of the roast control thermostat TH2 occasioned by a reduction of the oven temperature below 395° F. thus no longer affects the operation of the timing motor. The timing motor is designed to run about four minutes before it will shut itself off automatically.

Ten seconds after the timing motor has started, a timing motor switch TMS3 closes. Closure of the timing motor switch TMS3 completes a circuit through cylinder control relay K9 energizing said relay. When the relay K9 is energized, relay points K9B close and upon closure thereof a circuit is closed to a cylinder dumping solenoid A6. Flow of current through the cylinder dumping solenoid A6 results in operation of the cylinder control mechanism shown on the lower half of the cam plate 42, Fig. 1 of the drawings, whereby the rotation of the cylinder is arrested and the cylinder doors 44a and 44b are opened in discharge position. This preliminary operation at the end of the preheating cycle is desirable for the purpose of insuring complete discharge of any residual beans from a previous roasting operation.

Approximately fifteen seconds after the start of the timing motor TM, the timing switch TMS3 opens, thereby deenergizing the cylinder control relay K9. When the cylinder control relay coil K9 is deenergized, the relay points K9B are opened. Opening of the relay points K9B will serve to deenergize the cylinder dumping solenoid A6 which in turn releases the roasting cylinder for further rotation, the doors thereof being closed during the initial phase thereof.

Twenty seconds after the start of the timing motor TM a switch TMS2 thereof is closed with the result that a circuit is completed through the roaster loading solenoid A4. When the loading solenoid A4 is energized, the roasting cylinder will be arrested in green bean loading position and the doors thereof will be opened as heretofore described. This point, therefore, may be considered as the end of the preheating cycle.

When the doors 44a and 44b of the roasting cylinder are fully opened, the green bean loading switch MS3 will be closed through operation of the levers 122 and 126 as hereinabove described, thereby completing a circuit through the metering hopper solenoid A9. When the metering solenoid A9 is energized and operative, it is effective to close the upper metering gate 16 and open the lower metering gate 18, thereby permitting the metered quantity of beans in the metering chamber 12 to discharge from the metering hopper into the roasting cylinder.

Twenty-five seconds after the start of the timing motor TM, the timing motor switch TMS2 opens and the opening of the timing motor switch TMS2 deenergizes the roaster loading solenoid A4 whereby the roasting cylinder is released and continued rotation thereof takes place under the influence of the drive mechanism. During the first phase of the continued rotation of the roasting cylinder, the doors thereof are closed as hereinabove described and the lever 122 is released, the spring 126a moves the lever 126 in a clockwise direction and permits restoration of the green bean loading switch MS3. The metering hopper solenoid A9 is thus deenergized and the gates thereof are oscillated to their opposite limit positions under the influence of the operating spring 26. In this position the upper gate 16 is open, thereby permitting green beans to enter the metering chamber while the lower gate 18 overlies the discharge slot 14 and thereby retains the beans within the metering chamber.

The charging of cold green beans into the roasting cylinder results in a relatively sharp drop in temperature therein, so that within a range of 25 to 30 seconds the temperature has fallen from approximately 400° F. to a point just below 350° F. At this point the temperature of the temperature control thermostat TH3 will be that of the cold green beans since the bulb of the thermostat TH3 is disposed at the bottom of the roasting cylinder where it is normally influenced directly by the bean temperature. The drop in temperature opens the roast control thermostat TH2 and closes the temperature control thermostat TH3. Closure of the temperature control thermostat TH3 results in the compression of a circuit through the heater circuit relay coil K3 and through the relay points K7B. As a result the relay points K3A and K3B are closed and the lamp and heater circuits are energized. Heat will be applied to the roasting drum during continued rotation thereof, but in a typical roasting cycle as seen by reference to Fig. 6 the bean temperature may continue to drop for another 75 or 80 seconds until a low bean temperature of 260° F. is reached. Thereafter, the bean temperature begins to build up for a period of 160 to 170 seconds until the temperature thereof reaches 360° F. at which time the temperature control thermostat TH3 will open. The opening of the temperature control thermostat TH3 at this time as distinguished from its function during the preheating cycle will deenergize the heating circuit relay coil K3 since relay points K5A are now open because relay coil K5 is continually energized through closed relay points K5C and K7C. Naturally as soon as relay coil K3 is deenergized the relay points K3A and K3B of the lamp and heater circuit, respectively, will open.

It will be noted that while the temperature control thermostat TH2 disables the heater circuits at a bean temperature of 360° F., the roast control thermostat TH2 does not become effective to set into motion the timing motor TM which in turn controls the discharge of the roasted beans from the roasting cylinder until a bean temperature of 395° F. is reached. It is one of the important features of the invention to provide a roast control period between attainment of a bean temperature of 360° F. and what is now considered as the optimum final temperature of 395° F., and in providing this control period the disabling of the heating devices at 360° F. results in a reduced rate of temperature increase and provides a less critical end period during which the roast must be discharged from the roasting drum. Were it not for the fact that the heating elements are disabled prior to the time when discharge controls must be brought into operation, the temperature between 360° F. and 395° F. would rise at such a rapid rate as to render the discharge point of the beans from the roaster so critical as to be beyond accurate control.

Figure 6:
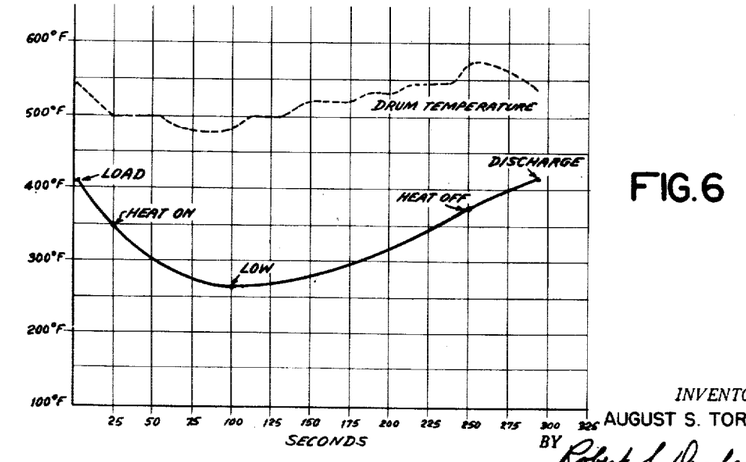
Fig. 6 shows temperature curves for a typical roasting cycle.

After the lamps and heaters are deenergized the temperature of the beans in the roasting oven will continue to rise by a kind of exothermic generation of heat, but as noted in the diagram of Fig. 6 the rate at which this rise takes place is such as to provide 45 or 50 seconds during which to initiate and effect control of the roaster discharge mechanism. When the bean temperature, therefore, reaches 395° F. the roast control thermostat TH2 will close and complete a circuit through the timing motor TM and through the timing motor switch TMS1 in the "A" position. It may be noted at this point that the timing motor which was in operation during the preheating period stopped of its own accord during the roasting cycle approximately four minutes after the beginning thereof. The timing motor is one that will make a single revolution and then discontinue operation. Closure of the roast control thermostat TH2 also results in energizing the relay coil K11 which closes relay points K11A. Closed relay points K11A, however, do not affect coil K5 as this coil is continually energized through its points K5C and K7C.

Closure of the roast control thermostat TH2 starts the timing motor TM. Approximately five seconds later the timing switch TMS1 is moved to the "B" position, which connects the timing motor directly across the power supply. Ten seconds after the timing motor starts, timing switch TMS3 closes. This results in flow of current to the cylinder control relay K9 which when energized closes relay points K9B. A circuit is thus completed to the cylinder discharge solenoid A6 which when energized brings into operation the cylinder arresting mechanism as hereinbefore described to halt rotation of the cylinder and open the doors thereof in roast discharging position.

Fifteen seconds after the starting of the timing motor TM the timing switch TMS3 opens and the cylinder control relay K9 is deenergized. When the cylinder control relay K9 is deenergized, the relay points K9B will open and the cylinder dumping solenoid A6 will be deenergized. Deenergization of the cylinder dumping solenoid A6 results in continued rotation of the roasting cylinder accompanied by closure of the cylinder doors during the initial phase of that rotation.

From this point on the roaster will operate to roast successive charges of green beans without further manual intervention. The subsequent roasting cycles differ from the original one in that they are not preceded by a preheating cycle. On the other hand approximately twenty seconds after the start of the timing motor TM the timing switch TMS2 closes and completes a circuit through the cylinder loading solenoid A4. When the loading solenoid A4 is energized, it operates the linkage system of the cylinder arresting mechanism as hereinbefore described to arrest rotation of the roasting cylinder in charging position where the doors are opened and a fresh charge of green beans is received into the roasting cylinder.

The final function of the timing motor TM is the closure of a timing motor switch TMS4 which closes a circuit in which is included the cool roast discharge solenoid A8. When the solenoid A8 is energized, it results in the opening of the roast discharge doors 132a and 132b as hereinbefore described.

The invention has been described in respect to a single roaster, but it is evident that the method may be otherwise practiced. Furthermore, changes may be made in the mechanical features of the roasting machine without affecting the practice of the invention as defined in the claims.

What I claim is:

1. The method of roasting coffee which comprises admitting a green batch thereof into an atmosphere preheated to a mean temperature of 400° F., agitating the batch in said atmosphere while applying heat thereto until the batch has been substantially dehydrated, thereafter discontinuing the appliction of heat, permitting the temperature of the batch to increase 25–45° F. at a slow rate by the exothermic action thereof until a preselected temperature within the range of 360–410° F. thereof has been attained, and thereupon promptly removing said batch from the roasting atmosphere and subjecting the same to a cooling medium.

2. The method of roasting coffee which comprises admitting a green batch thereof to an atmosphere preheated to a mean temperature in excess of 400° F., agitating the batch in said atmosphere while elevating the temperature of the batch to a mean temperature of 360° F., discontinuing the application of heat to the batch under treatment, permitting the temperature of the batch to proceed to a mean temperature of 395° F. and thereafter promptly removing said batch from the roasting atmosphere and subjecting the same to a cooling medium.

3. The method of roasting coffee which comprises admitting a green batch thereof to an atmosphere preheated to a mean temperature of 400° F., agitating the batch in said atmosphere while elevating the temperature of the batch to a mean temperature of 360° F. by applying a source of heat that includes infrared radiations, discontinuing the application of heat to the batch under treatment, permitting the temperature of the batch to proceed to a mean temperature of 395° F. and thereafter promptly removing said batch from the roasting atmosphere and subjecting the same to a cooling medium.

4. The method of roasting coffee which comprises admitting a green batch thereof to a confined atmosphere preheated to a mean temperature of 400° F., agitating the batch in said atmosphere while elevating the temperature of the batch to a mean temperature of 360° F., discontinuing the application of heat to the batch under treatment, permitting the temperature of the batch to proceed to a mean temperature of 395° F., thereafter promptly removing said batch from the roasting atmosphere and subjecting the same to a cooling medium, and limiting the roasting period to a period not substantially more than five minutes.

5. The method of roasting coffee which comprises admitting a green batch thereof to an atmosphere preheated to a mean temperature of 400° F., agitating the batch in said atmosphere while elevating the temperature of the batch to a mean temperature of 360° F., discontinuing the application of heat to the batch under treatment, permitting the temperature of the batch to proceed to a mean temperature of 395° F., thereafter promptly removing said batch from the roasting atmosphere at a preselected temperature within the range of 395° F. and 410° F., and subjecting the same to a cooling medium.

6. The method of roasting coffee which comprises admitting a green batch thereof to an atmosphere preheated to a mean temperature of 400° F., agitating the batch in said atmosphere while elevating the temperature of the batch to a temperature selected from the range of 315–385° F., discontinuing the application of heat to the batch under treatment, permitting the temperature of the batch to increase by exothermic action to the temperature selected from the range 360–410° F., and thereafter promptly removing the batch from the roasting atmosphere and subjecting the same to a cooling medium.

AUGUST S. TORRES.

REFERENCES CITED

The following references are of record in the file of this patent:

UNITED STATES PATENTS

| Number | Name | Date |
|---|---|---|
| 2,464,421 | Torres | Mar. 15, 1949 |

Certificate of Correction

Patent No. 2,572,679            October 23, 1951

AUGUST S. TORRES

It is hereby certified that error appears in the printed specification of the above numbered patent requiring correction as follows:

Column 12, line 51, for "beam" read *bean*; column 14, lines 51 and 52, strike out "in excess";

and that the said Letters Patent should be read as corrected above, so that the same may conform to the record of the case in the Patent Office.

Signed and sealed this 5th day of February, A. D. 1952.

[SEAL]

THOMAS F. MURPHY,
*Assistant Commissioner of Patents.*